United States Patent
Tadakuma et al.

(10) Patent No.: US 6,892,015 B2
(45) Date of Patent: May 10, 2005

(54) OPTICAL PULSE WAVEFORM CONVERSION

(75) Inventors: Masateru Tadakuma, Tokyo (JP); Osamu Aso, Tokyo (JP); Misao Sakano, Tokyo (JP)

(73) Assignee: The Furukawa Electric Company, Ltd., Tokyo (JP)

( * ) Notice: Subject to any disclaimer, the term of this patent is extended or adjusted under 35 U.S.C. 154(b) by 96 days.

(21) Appl. No.: 10/057,733

(22) Filed: Jan. 23, 2002

(65) Prior Publication Data

US 2002/0164135 A1 Nov. 7, 2002

(30) Foreign Application Priority Data

Jan. 30, 2001 (JP) ........................................ 2001-022220

(51) Int. Cl.$^7$ ............................ G02B 6/00; H04B 10/00
(52) U.S. Cl. ........................................ 385/122; 398/81
(58) Field of Search ................................ 385/122, 123, 385/1–3, 14, 37, 24; 398/81

(56) References Cited

U.S. PATENT DOCUMENTS

| | | | | | |
|---|---|---|---|---|---|
| 5,499,134 | A | * | 3/1996 | Galvanauskas et al. | 359/333 |
| 5,530,778 | A | * | 6/1996 | Rast | 385/24 |
| 5,694,239 | A | * | 12/1997 | Shigematsu et al. | 359/332 |
| 5,798,853 | A | * | 8/1998 | Watanabe | 398/150 |
| 5,982,963 | A | * | 11/1999 | Feng et al. | 385/37 |
| 6,330,383 | B1 | * | 12/2001 | Cai et al. | 385/37 |
| 6,424,774 | B1 | * | 7/2002 | Takeda et al. | 385/122 |
| 6,476,949 | B1 | * | 11/2002 | Loh et al. | 398/158 |
| 6,522,818 | B1 | * | 2/2003 | Aso et al. | 385/122 |

FOREIGN PATENT DOCUMENTS

| EP | 0 732 819 | 9/1996 |
|---|---|---|
| EP | 0 922 992 | 6/1999 |
| EP | 1 035 671 | 9/2000 |

OTHER PUBLICATIONS

M. Tadakuma, et al., Optical Fiber Communication Conference, Technical Digest Postconference Edition, Trends in Optics and Photonics, vol. 37, XP–002239776, pp. 178–180, "A 104GHZ 328FS Soliton Pulse Train Generation Through A Comb–Like Dispersion Profiled Fiber Using Short High Nonlinearity Dispersion Fibers", 2000.
M. J. Guy, et al., IEEE Photonics Technology Letters, vol. 9, No. 7, XP–000659112, pp. 1017–1019, "A Duration–Tunable, Multiwavelength Pulse Source for OTDM and WDM Communications Systems", Jul. 1, 1997.
H. Toda, et al., IEEE Photonics Technology Letters, vol. 9, No. 10, XP–000721350, pp. 1415–1417, "Optical Soliton Transmission Experiment in a Comb–Like Dispersion Profiled Fiber Loop", Oct. 1, 1997.
S. V. Chrnikov, et al., IEE Colloquium on Optical Fibre Gratings and Their Applications, vol. 17, XP–000670820, pp. 10/1–10/4, "100GBIT/S Dispersion Compensation using Cascaded Chirped Fibre Grating Transmission Filters", Jan. 30, 1995.
O. Aso. et al., IEDICE Transactions on Electronics, vol. E83–C, No. 6, XP–002252860, pp. 816–822, "Efficient FWM Based Broadband Wavelength Conversion Using A Short High–Nonlinearity Fiber", Jun. 2000.
Watanabe et al., Interband Wavelength Conversion of 320 Gb/s (32×10Gb/s) WDM Signal Using a Polarization–Insensitive Fiber Four–Wave Mixer. (1998) ECOC pp. 85–86.

* cited by examiner

Primary Examiner—Joseph Williams
Assistant Examiner—Peter Macchiarolo
(74) Attorney, Agent, or Firm—Oblon, Spivak, McClelland, Maier & Neustadt, P.C.

(57) ABSTRACT

A waveform converter for altering the waveform and optical spectrum of an optical signal may comprise a nonlinear element having a nonlinear effect on optical pulses, a dispersion element having a dispersion effect on optical pulses, and a wavelength selecting element configured to select spectral components in a desired wavelength region.

17 Claims, 11 Drawing Sheets

OPTICAL PULSE WAVEFORM CONVERSION

BACKGROUND OF THE INVENTION

1. Field of the Invention

The invention relates to waveform converters, with some embodiments suitable for use as waveform converters for optical communication systems.

2. Description of the Related Art

Optical fibers are widely used for communicating information, such as in large telecommunication systems, primarily owing to their reliability, their insensitivity to electrical interference, and their high data capacity. It is desirable to use fiber optic communication networks as efficiently as possible, especially when the networks are implemented over long distances. In order to transmit optical signals over these long distances, the signals generally must be amplified before transmission to compensate for transmission losses. An erbium-doped fiber amplifier, for example, is capable of directly amplifying signal light to obtain a high-intensity optical signal in the 1550 nm wavelength band, thereby enabling compensation for transmission loss in optical fibers forming optical paths, and hence, unrepeated transmission over several thousand kilometers. To increase the efficiency of transmission, the amount of information that is sent in a specific amount of time can be increased by making optical pulses as short as possible. Short pulses are advantageous in high data rate transmission techniques such as wavelength division multiplexing (WDM) and time division multiplexing (TDM).

For effective high data rate transmissions, optical signals generally require a narrow pulse width in a selected wavelength band. In some systems, dispersive and nonlinear effects in the transmission fibers can be used advantageously to modify the pulse width/shape of an optical signal. As additional signals are added to a communication path at different wavelengths, a number of signals may need to change their wavelengths in addition to modifying and/or controlling the shape of the optical pulse.

One approach to converting the wavelength of an optical signal is opto-electro-optical, wherein an optical signal is converted into an electrical signal using a photoelectric converter (i.e. photo-detector, photodiode), and the electrical signal drives a light source at a different wavelength. This method, however, entails problems such as high operating costs and difficulty in controlling the pulse width of the signal.

Additional methods for directly converting the wavelength of an optical signal utilize a semiconductor amplifier and nonlinearity properties of optical fibers. The method comprises directing the input signal at a first wavelength onto a semiconductor device, which is amplifying a steady signal at a second wavelength than the input signal. The input signal changes the amount of amplification at the second wavelength, thereby modulating the steady signal to reproduce the input signal at a different wavelength. A disadvantage, however, to using a semiconductor amplifier is a rather low signal to noise ratio.

The nonlinearity of an optical transmission medium can also be utilized such that idler light generated on the basis of a four-wave mixing (FWM) phenomenon is obtained as a wavelength converted signal. See, for example, "Interband Wavelength Conversion of 320 Gb/s WDM Signal Using a Polarization-Insensitive Fiber Four-Wave Mixer" by Watanabe, Takeda, and Chikawa, ECOC'98, September 1998, page 85. Four-wave-mixing methods, however, typically require a separate excitation light source having a different wavelength than the input signal. In addition, in order to obtain an optical signal of a desired converted wavelength, the light source wavelength must be adjusted to satisfy a phase matching condition for FWM.

Thus, it is considerably difficult to simultaneously control and manipulate both the pulse width and/or shape and the wavelength range of an optical signal effectively. It will therefore be appreciated that a device which effectively performs such a function is needed in the art.

SUMMARY OF THE INVENTION

Methods and apparatus for waveform conversion and/or shaping are provided. In one embodiment an optical pulse waveform converter comprises a coupled plurality of optical elements. The optical elements comprise an optical pulse input port configured to receive an input optical pulse, a nonlinear optical element configured to broaden a wavelength content of an optical pulse routed through the nonlinear optical element, a dispersive optical element configured to modify a temporal profile of an optical pulse routed through the dispersive optical element, and a wavelength selecting optical element configured to pass selected wavelength components of an optical pulse routed through the wavelength selecting optical element. Also provided is an optical pulse output port configured to output an optical pulse comprising different optical characteristics than the input optical pulse.

In another embodiment, a method for converting an optical pulse waveform comprises broadening the wavelength content and narrowing the temporal width of an input optical pulse to produce a modified optical pulse. The method also comprises selecting a portion of the wavelength content of the modified optical pulse to produce an output optical pulse. The broadening and narrowing may be performed in any order.

The invention also comprises optical pulse light sources. In one embodiment, an optical pulse light source comprises a modulated signal light source having output pulses characterized by a temporal waveform and a wavelength content. The light source further comprises a waveform converter coupled to receive the output pulses from the signal light source and comprising a nonlinear optical element, a dispersive optical element, and a wavelength selecting optical element, wherein the waveform converter is configured to output optical pulses which have different wavelength content than the optical pulses output from the signal light source.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

In many advantageous embodiments of the invention, the frequency content of optical pulses are changed in an efficient and effective manner that provides control over both the wavelength content and temporal profiles of the output pulses produced with systems and methods made in accordance with the principles presented herein. In many advantageous embodiments, methods of optical waveform conversion include receiving an input optical pulse waveform, broadening the wavelength content of the input optical pulse waveform, and selecting a desired wavelength range from within the broadened optical spectrum. In some embodiments, the input optical pulse is both broadened in wavelength content and narrowed in temporal width prior to selecting the desired wavelengths from the broadened wavelength content.

Systems implementing this method may, for example, route the input optical pulse to a medium having nonlinear optical characteristics to broaden the wavelength spectrum of the pulse. The pulse may also be routed through a dispersive medium to narrow the width of the pulse in time. The desired wavelength range for the output pulse can be selected with a grating, filter, or other wavelength selecting optical element. Such a system and method is very flexible and cost effective because the functions can be performed in a variety of different orders. In addition, a variety of optical elements are available to perform these functions. In some embodiments, a single optical element can perform more than one of the waveform converting functions at the same time. Using systems and methods in accordance with the principles described herein allows the efficient conversion of optical pulses having undesirable frequency content and temporal shape characteristics into output pulses optimized for amplification and use in high speed optical communication systems.

Figure 1:
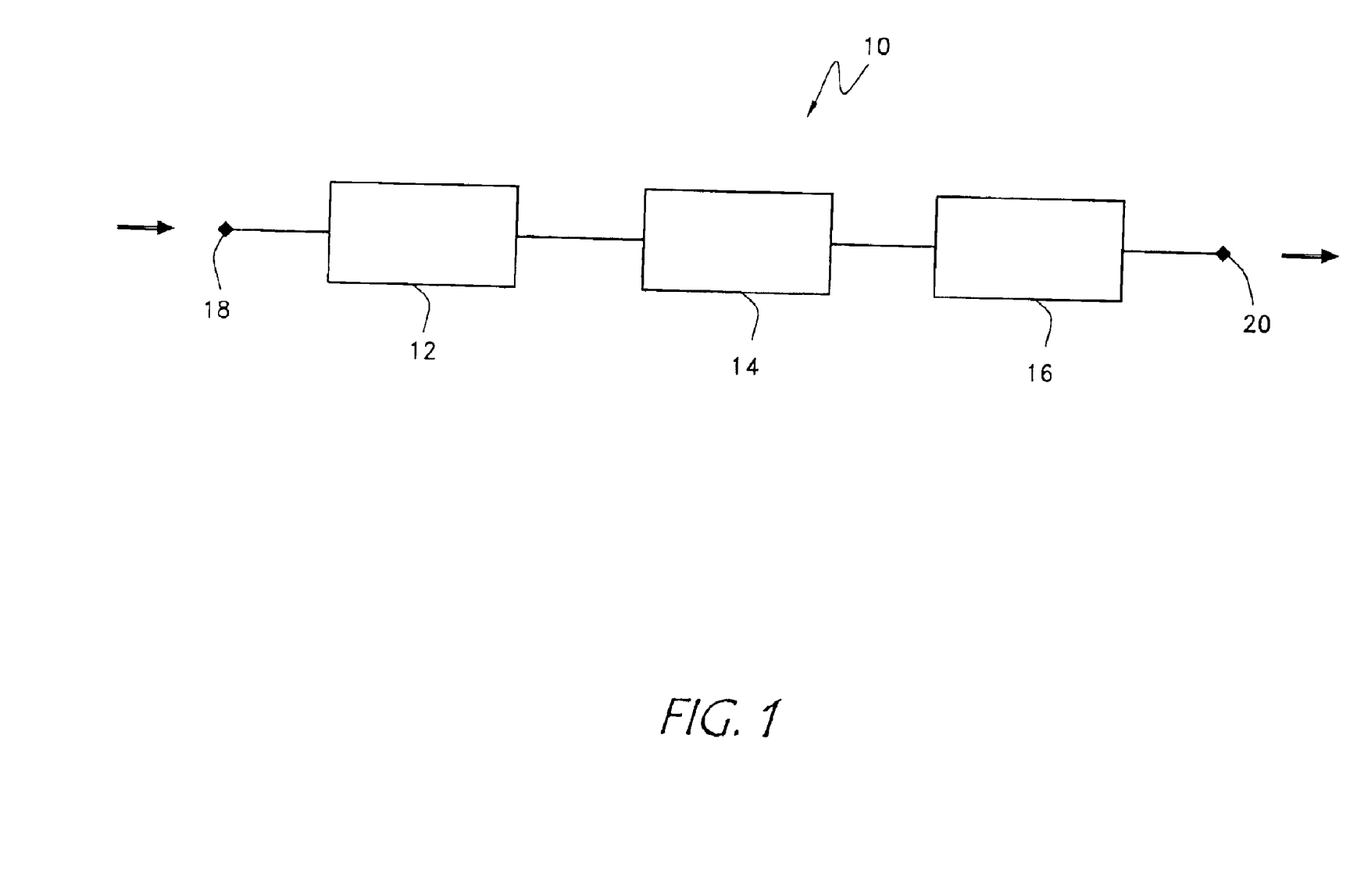
FIG. 1 is a block diagram of one embodiment of an optical waveform converter.

FIG. 1 is a block diagram of one embodiment of an optical waveform converter 10. The waveform converter 10 comprises a plurality of elements which may be optically connected in series as shown in FIG. 1, but which may be combined or joined in other ways, some examples of which are provided further below. The elements of the waveform converter of FIG. 1 comprise a nonlinear medium 12 having a nonlinear effect on optical pulses, a dispersion medium 14 having a dispersion effect on optical pulses, and a wavelength selecting element 16 for selecting spectral components of the optical waveform in a desired wavelength region. The converter 10 typically also includes an input port 18 and output port 20 for receiving and emitting signals respectively. The order in which the elements 12, 14, 16 of the waveform converter 10 are arranged is not limited to that described or shown in the Figures and is only presented as an exemplary configuration. An optical input signal can be supplied to an input signal section 18 for transmission through the elements 12, 14, 16 of the waveform converter 10 to produce an output signal at an output signal section 20.

Figure 2A:
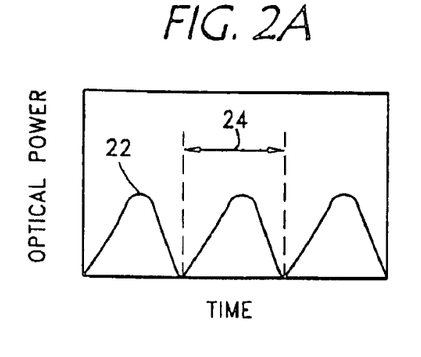
FIG. 2A is a time domain graphical illustration of an exemplary optical signal applied to the waveform converter of FIG. 1.
Figure 2B:
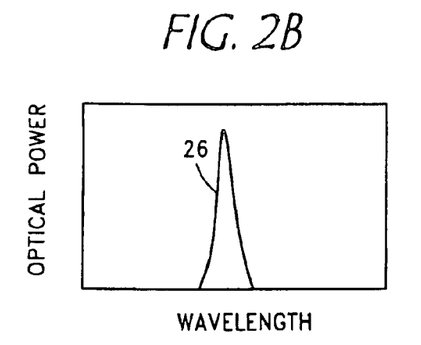
FIG. 2B is a graphical illustration of an optical spectrum graph of the optical signal of FIG. 2A.
Figure 3A:
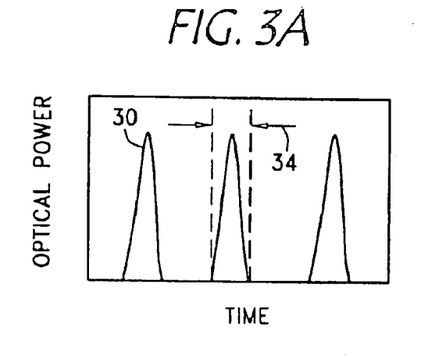
FIG. 3A is a time domain graphical illustration of the optical signal of FIG. 2A after passing through the nonlinear medium and dispersion medium of the waveform converter of FIG. 1.
Figure 3B:
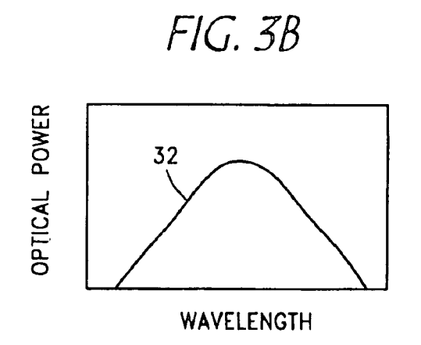
FIG. 3B is a graphical illustration of an optical spectrum graph of the optical signal of FIG. 3A.
Figure 4A:
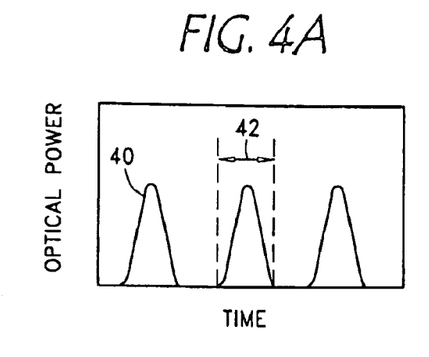
FIG. 4A is a time domain graphical illustration of the optical signal of FIG. 3A after passing through the wavelength selecting medium of the waveform converter of FIG. 2.

FIGS. 2 through 4 illustrate the effects of the elements 12, 14, 16 of the waveform converter 10 on an optical pulse signal. An exemplary optical signal (optical pulses), having a time domain waveform 22 with a pulse width 24 as shown in FIG. 3A, and an optical spectrum 26 as shown in FIG. 3B, will be used to illustrate the effects of this embodiment of the waveform converter 10. As each optical pulse passes through the nonlinear medium 12, followed by the dispersion medium 14, the wavelength content, referred to also as the optical spectrum of the signal is widened by the nonlinear effect of the nonlinear medium 12. The duration, or temporal width, of the optical pulse is reduced by the dispersion effect of the dispersion medium 14. FIG. 3A illustrates a time domain waveform 30 of the optical signal and FIG. 3B illustrates an optical spectrum 32 of the optical signal after passing through the nonlinear medium 12 and the dispersion medium 14. As can be seen in FIG. 4A, a pulse width 34 of the optical signal has been reduced by the nonlinear medium 12 as compared to the pulse width 24 of the original waveform 22. In addition, the optical spectrum 32 shown in FIG. 3B is wider than the spectrum 26 shown in FIG. 3B also due to the effects of the nonlinear medium 12.

Figure 4B:
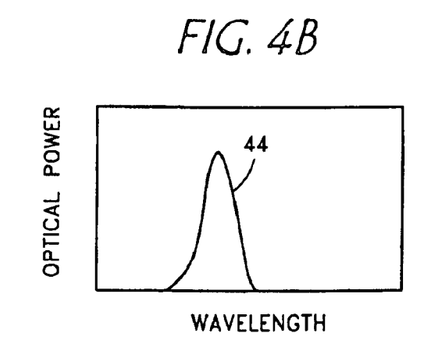
FIG. 4B is a graphical illustration of an optical spectrum graph of the optical signal of FIG. 4A.

After passing through the nonlinear medium 12 and the dispersion medium 14, the above-described optical signal passes through the wavelength selecting element 16. The wavelength selecting element 16 is characterized by a wavelength pass band that selects spectral components of the optical signal from the optical spectrum 32 shown in FIG. 3B, in the desired wavelength range. The resulting optical signal 40 is shown in FIGS. 4A and 4B having a pulse width 42, with energy content in the wavelength range shown in the optical spectrum 44 of FIG. 5B.

As previously discussed, the elements 12, 14, 16 of the waveform converter 10 do not have to be arranged in the order described and shown in FIG. 1. For example, in the event an input optical signal has pulses which change in wavelength with respect to time (chirping), the elements can be arranged such that the nonlinear medium 12 and the dispersion medium 14 are optically connected in an order such that the signal passes through the dispersion medium 14 before the nonlinear medium 12. The dispersion medium 14 can then first correct the chirping in the signal, and the signal can then propagate through the nonlinear medium 12 to widen the optical spectrum of the signal, followed by selection of the desired wavelength range by the wavelength selecting element 16.

Each of the elements 12, 14, 16 may comprise more than one optical component. For example, an additional embodiment of the waveform converter 10 may employ a double-element stage in place of the single-element stage using the above described elements 12, 14, 16. A double-element stage can be formed by connecting two or more components, each corresponding to an element 12, 14, and 16, so as to enable shaping of different optical pulses.

Furthermore, each of the above described elements 12, 14, 16 is not limited to a single function. A chirped fiber bragg grating, for example, having a dispersion effect and a wavelength selecting function may be used. In such a case, the number of components comprising the waveform converter can be reduced in comparison to the converter 10 shown in FIG. 1 while having the same effect on an optical signal.

Figure 5:
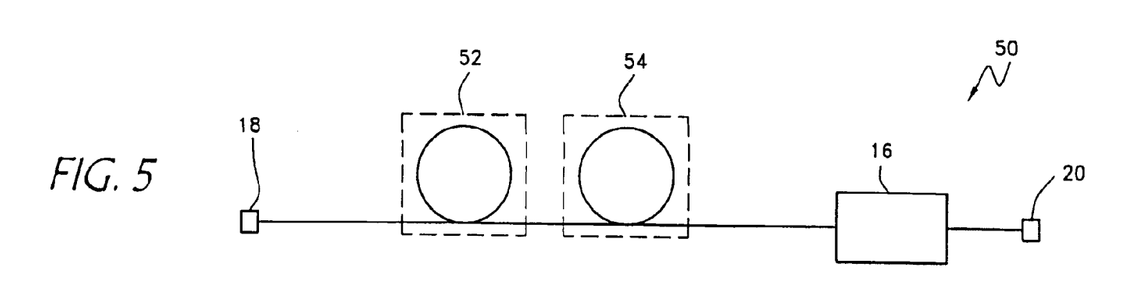
FIG. 5 is a block diagram of an additional embodiment of an optical waveform converter.

FIG. 5 illustrates an additional embodiment of the waveform converter 10. In this embodiment the nonlinear medium 12 and the dispersion medium 14 are implemented with optical fibers 52, 54 having different nonlinear coefficients and dispersion characteristics.

In one specific embodiment, a 1550 nm band zero-dispersion shifted fiber (dispersion shifted fiber (DSF)) can be used as the nonlinear medium 52, and a 1300 nm band zero-dispersion fiber (single-mode fiber (SMF)) can be used as the dispersion medium 54. By comparing the characteristics of the two fibers 52, 54 it can be shown that the nonlinear coefficient γ (wherein γ is defined as below) of the first fiber 52 is larger than that of the second fiber 54, and that the dispersion effect of the DSF 52 is lower than that of the SMF 54.

$$\gamma = \frac{2\pi}{\lambda n_2 A_{\mathit{eff}}}$$

$\lambda \equiv$ wavelength $n_2 \equiv$ nonlinear refractive index $A_{\mathit{eff}} \equiv$ effective fiber core area In the DSF 52, therefore, the nonlinear effect on optical pulses dominates the dispersion effect. Conversely, in the SMF 54 the dispersion effect dominates the nonlinear effect. Consequently, in the waveform converter 50 the optical spectrum of pulses is widened by the DSF 52, the duration of the pulses is narrowed by the SMF 54, and the spectral components in the desired wavelength range are selected by the wavelength selecting element 16. The final optical signal obtained at the output signal section 20 has shaped optical pulse widths with the desired wavelength content.

The waveform converter 50 effectively reduces the transmission loss of signal power of an optical signal transmitted through it due to the particular characteristics of the optical fibers 52, 54, as discussed above, used as the nonlinear and dispersion mediums.

Alternatively, the wavelength selecting element 16 does not have to be located after the DSF 52 and the SMF 54 as shown in FIG. 5. The wavelength selecting element 18 may be placed, for example, between the DSF 52 and the SMF 54.

In the waveform converter 50 shown in FIG. 5, a highly nonlinear optical fiber having particular characteristics, such as those shown in Table 1, can be used favorably to replace the DSF 52. The γ value of the highly nonlinear optical fiber in the table, a 1550 nm band zero-dispersion fiber, is approximately five times larger than that of ordinary 1550 nm band zero-dispersion DSF's which have a γ value of approximately 2.5 $W^{-1}Km^{-1}$.

TABLE 1

| Characteristic Item | Value |
| --- | --- |
| Transmission Loss | 0.61 dB/km |
| Zero-dispersion wavelength ($\lambda_0$) | 1565.5 nm |
| Dispersion Slope | 0.029 ps/nm$^2$/km |
| Nonlinear optical coefficient (γ) | 13.8 $W^{-1}km^{-1}$ |

When a highly nonlinear optical fiber, such as the one having characteristics shown in Table 1, is used as a nonlinear medium 52 in the waveform converter 50, the length of the fiber can be reduced in comparison with that of the ordinary optical fiber in the converter 50. Preferably, the nonlinear coefficient is greater than about 5.0 $W^{-1}km^{-1}$, more preferably greater than about 10.0 $W^{-1}km^{-1}$.

If such a highly nonlinear optical fiber is used to reduce the total fiber length, the entire configuration of the converter can be simplified, the polarization of transmitted optical pulses can be limited, and the transmission loss can be reduced. As a result, the converter can generate an optical pulse having a widened optical spectrum with considerably low influence from polarization dispersion following transmission through the dispersion medium.

Figure 6:
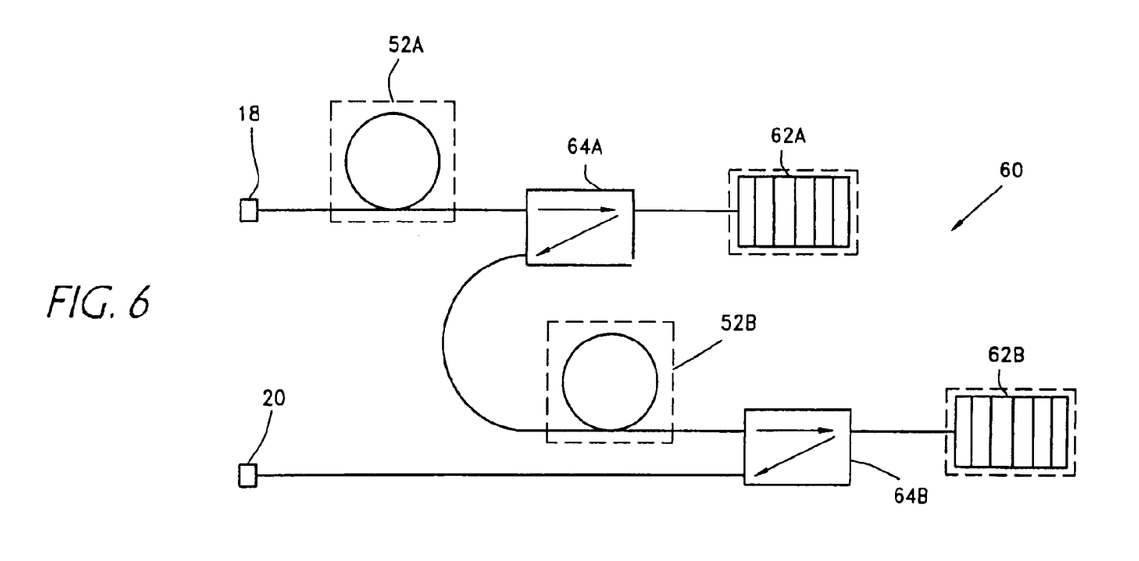
FIG. 6 is a block diagram of one embodiment of a two phase optical waveform converter.

FIG. 6 illustrates an additional embodiment of a waveform converter 60 having two stages. The first stage of the waveform converter 60 is formed using a DSF 52A similar to that of FIG. 5, and a chirped fiber grating 62A in place of the SMF 54 of FIG. 6. The DSF 52A and the chirped fiber grating 62A are connected by an optical circulator 64A, which also connects the first stage of the converter 60 to the second stage of the converter 60. The second stage of the converter has similar components 52B, 62B, 64B to the first stage, and the optical circulator 64B is connected to the output signal section 20 through a second chirped fiber grating 62B.

The chirped fiber grating 62A–B in the waveform converter 60 functions as a dispersion medium as well as a wavelength selecting element. Therefore, an optical pulse signal supplied to the input signal section 18 of the converter 60 is converted into an optical pulse having a shaped pulse width and a desired wavelength.

Figure 7:
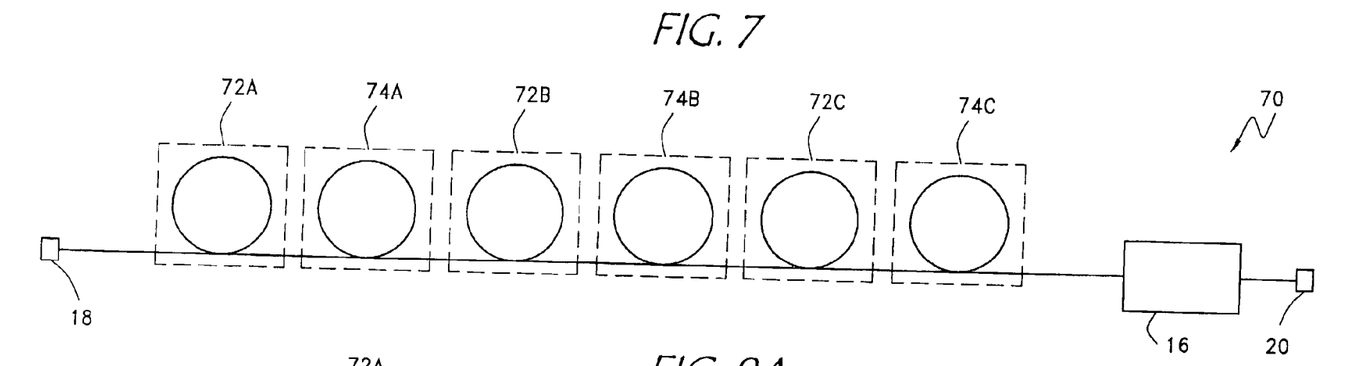
FIG. 7 is a block diagram of an additional embodiment of an optical waveform converter.

FIG. 7 illustrates an additional embodiment of a waveform converter 70. This converter embodiment 70 is formed by alternately disposing two types of optical fibers 72, 74, wherein each type of fiber differs from the other in nonlinearity and dispersion characteristics. A total of six optical fibers 72A–C, 74A–C are used in the converter 70 of FIG. 7, optically connected to the wavelength selecting element 16. The number of optical fibers that can be used is not limited to six, and either a larger or smaller number of fibers can be used. More specifically, the converter 70 can be designed such that the first type of optical fibers 72A–C function as a nonlinear medium and the second type of optical fibers 74A–C function as a dispersion medium.

Figure 8A:
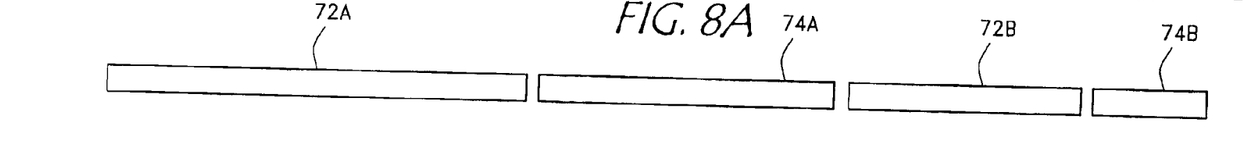
FIG. 8A is an illustration of an optical transmission path comprising a plurality of optical fibers.
Figure 8B:
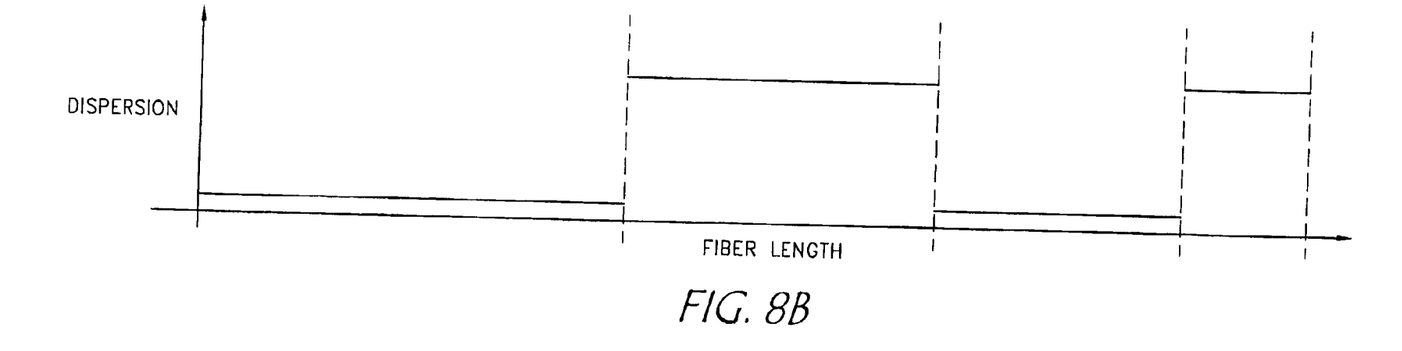
FIG. 8B is a graphical illustration of dispersion levels versus fiber length corresponding to the optical fibers of FIG. 8A.

Although six optical fibers 72A–C, 74A–C are described and illustrated with respect to FIG. 7, an example using only four optical fibers will first be presented to illustrate changes in an optical pulse as it propagates through alternating optical fibers 72A–B, 74A–B. FIG. 8 illustrates an optical transmission path 80 formed by connecting two types of optical fibers differing in dispersion characteristics and length comprising DSF's 72A–B, and SMF's 74A–B. The combination of fibers illustrated in FIG. 8 is sometimes referred to as a comb-like dispersion profiled fiber (CDPF).

Referring now to FIGS. 9–13, the example presented to qualitatively describe the waveform conversion process comprises providing beat light to the optical transmission path 80 of FIG. 8. The beat light may be created by multiplexing two laser light beams having slightly different wavelengths. In this example, a nonlinear effect produced in the DSF's 72A and 72B, and chirp compensation provided by the SMF's 74A and 74B contribute to pulse shaping of the beat light.

Figure 9A:
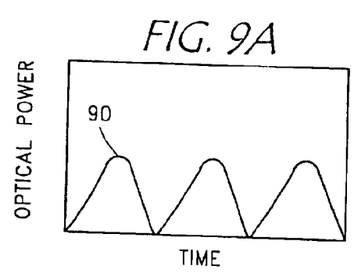
FIG. 9A is a time domain graphical illustration of an exemplary optical signal.
Figure 9B:
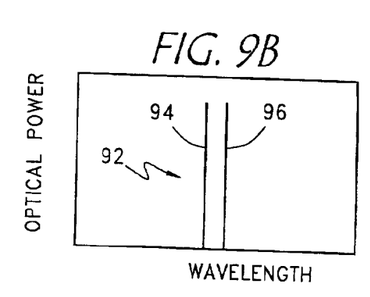
FIG. 9B is a graphical illustration of an optical spectrum graph of the time domain waveform of FIG. 9A.
Figure 10A:
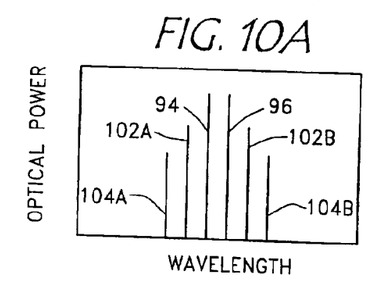
FIG. 10A is a graphical illustration of an optical spectrum graph of the optical signal of FIG. 9A following transmission through a first optical fiber of the optical transmission path of FIG. 8A.
Figure 10B:
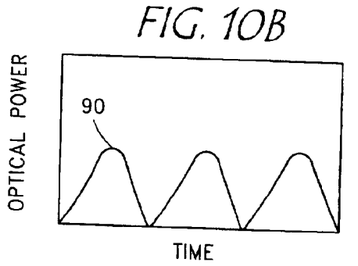
FIG. 10B is a time domain graphical illustration corresponding to the optical spectrum of FIG. 10A.

For explanation of the effects of the transmission path of FIG. 8 on an optical signal, a time-domain waveform 90 as shown in FIG. 9A, and an optical spectrum 92 as shown in FIG. 9B with two wavelengths 94, 96, will be supplied to the optical transmission path 80. As the optical pulses 90 pass through the first-stage DSF 72A, four-wave mixing (FWM) between the two-wavelength 94, 96 optical pulses produces sideband components 102A–B, 104A–B in the optical spectrum, as shown in FIG. 10A, thereby causing chirping in the signal. The time-domain waveform corresponding to the spectrum of FIG. 10A is illustrated in FiG. 10B, where it can be seen that the temporal waveform is substantially unchanged from that of FIG. 10A.

Figure 11A:
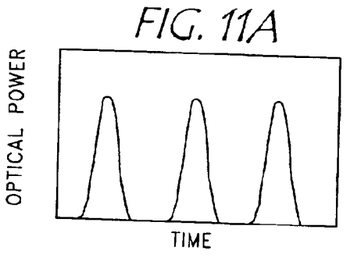
FIG. 11A is a time domain graphical illustration of the optical signal of FIG. 10B following transmission through a second optical fiber of the optical transmission path of FIG. 8A.
Figure 11B:
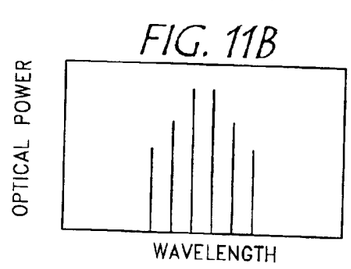
FIG. 11B is a graphical illustration of an optical spectrum graph of the time domain waveform of FIG. 11A.

As the optical pulses pass through the first-stage SMF 74A, an anomalous dispersion effect is exerted on the transmitted optical pulses of FIG. 11B to compensate for chirping in the rising and falling portions of the optical pulses. The dispersion effect thereby reduces the optical pulse width, which is illustrated in the time-domain waveform of FIG. 11A along with increased optical peak power. The optical spectrum corresponding to the waveform of FIG. 11A is illustrated in FIG. 11B, such that the optical spectrum from FIG. 10A is substantially maintained.

Figure 12A:
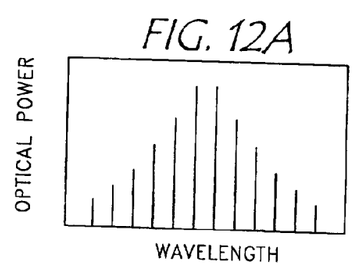
FIG. 12A is a graphical illustration of an optical spectrum of the optical signal of FIG. 11A following transmission through a third optical fiber of the optical transmission path of FIG. 8A.
Figure 12B:
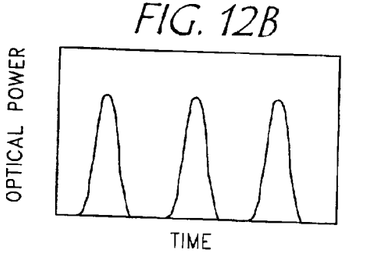
FIG. 12B is a time domain graphical illustration corresponding to the optical spectrum of FIG. 12A.

The optical pulse is then transmitted from the first-stage SMF 74A to the second-stage DSF 72B where a nonlinear effect due to self phase modulation (SPM) is exerted on the optical pulse to cause down-chirping in the rising portion of the optical pulse, and up-chirping in the falling portion of the optical pulse. The nonlinear effect thereby widens the optical spectrum of the optical signal as shown in FIG. 12A. The time domain waveform corresponding to the optical spectrum of FIG. 12A is illustrated in FIG. 12B, wherein the temporal waveform is substantially unchanged from that of FIG. 11A.

Figure 13A:
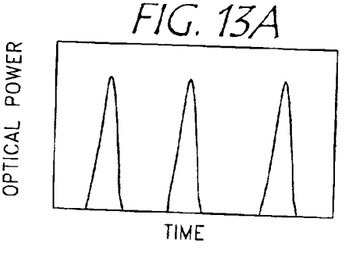
FIG. 13A is a time domain graphical illustration of the optical signal of FIG. 12B following transmission through a fourth optical fiber of the optical transmission path of FIG. 8A.
Figure 13B:
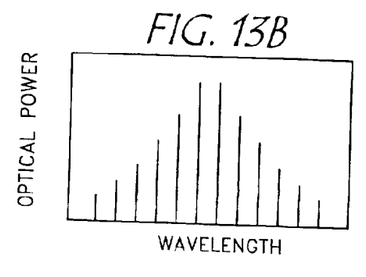
FIG. 13B is graphical illustration of an optical spectrum of the time domain waveform of FIG. 13A.

Further compensation is made as the optical signal passes through the second stage SMF 74B where the pulse width of the optical pulse is reduced, thereby obtaining a time-domain waveform as shown in FIG. 13A. The optical spectrum corresponding to the waveform of FIG. 13A is shown in FIG. 13B, where the widened optical spectrum of FIG. 12A is substantially maintained.

As illustrated in the example optical transmission path 80, an input optical pulse can be reduced in pulse width in steps in addition to widening of the optical spectrum. Spectral components in the desired wavelength can then be selected from the widened optical spectrum.

A waveform shaping section in the optical transmission path can be formed for shaping a time-domain waveform without using an optical fiber having a special dispersion structure, such as a dispersion-decreasing fiber wherein dispersion is reduced in the light propagation direction, corresponding to that of the waveform shaping section. In addition the combination of optical fibers can be optimized by adjusting the lengths of the fibers in relation to the dispersion characteristics of the fibers, and specifications relating to the input optical pulse, such as optical power, pulse width, and pulse period.

The converter 70 of FIG. 7 employs the above described functions of the optical transmission path. More specifically, an optical pulse output signal from the SMF 74C of the converter 70 has a reduced pulse width and a widened optical spectrum. Spectral components in the desired wavelength range can then be selected form the widened optical spectrum by the wavelength selecting element 16. Thus, an optical pulse, having a shaped pulse width and desired wavelength, can be obtained from the converter 70 at the output signal section 20.

The converter 70 of FIG. 7 utilizes optical fibers as nonlinear and dispersion mediums. However, optical transmission media having effects on optical pulses similar to the optical fibers 72A–C, 74A–C may be alternately disposed in place of the fibers. A wavelength selecting element may be incorporated in an optical transmission path formed by a combination of such media so as to also enable optical spectrum control. In such a case, the number of wavelength selecting elements and the positions at which the wavelength selecting elements are incorporated may be arbitrarily selected in relation to the desired optical spectrum.

Figure 14:
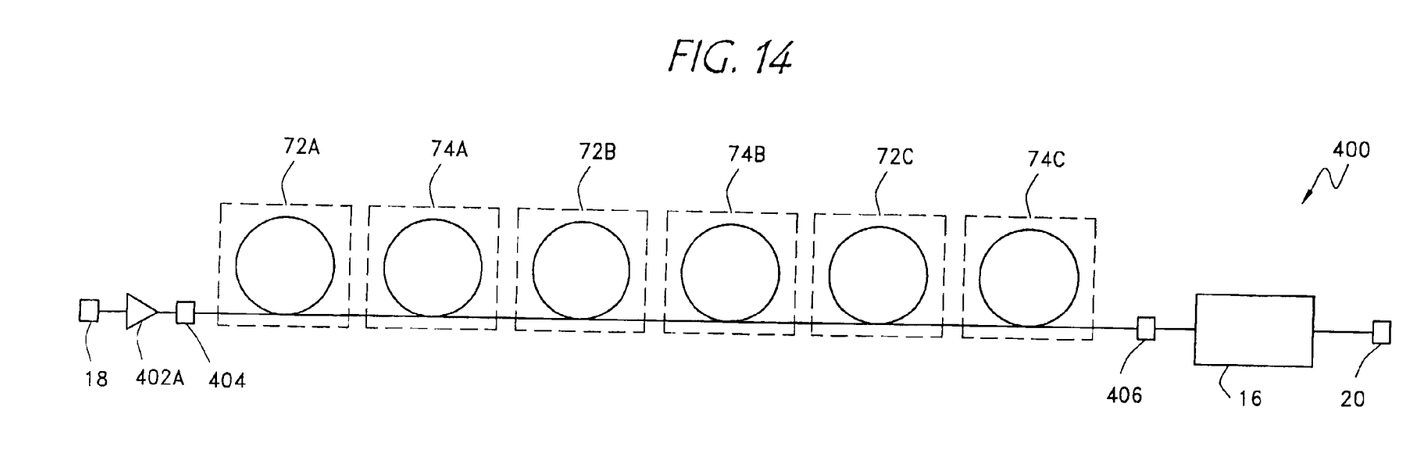
FIG. 14 is a block diagram of an additional embodiment of an optical waveform converter.

FIG. 14 illustrates an additional embodiment of a waveform converter 400. The converter 400 is formed by placing an optical amplifier 402A between the first stage nonlinear medium (DSF) 72A and the input signal section 18 of the converter 70 illustrated in FIG. 7. In the converter 400 of FIG. 14 an optical pulse signal supplied to the input signal section 18 is increased in optical power by the optical amplifier 402A. The high-power optical pulse then propagates through an input port 404 to enter the optical transmission path comprised of the alternating optical fibers 72A–C, 74A–C of FIG. 7 to undergo the nonlinear and dispersion effects such as those described above. The optical signal is then transmitted through an output port 406 on the last dispersive fiber, having been converted into an optical pulse having a reduced pulse width and a widened optical spectrum. From this pulse, spectral components in the desired wavelength range are selected by the wavelength selecting element 16. A specific example of a waveform converter built in accordance with FIG. 14 is further described hereafter.

Figures 15A, 15B:
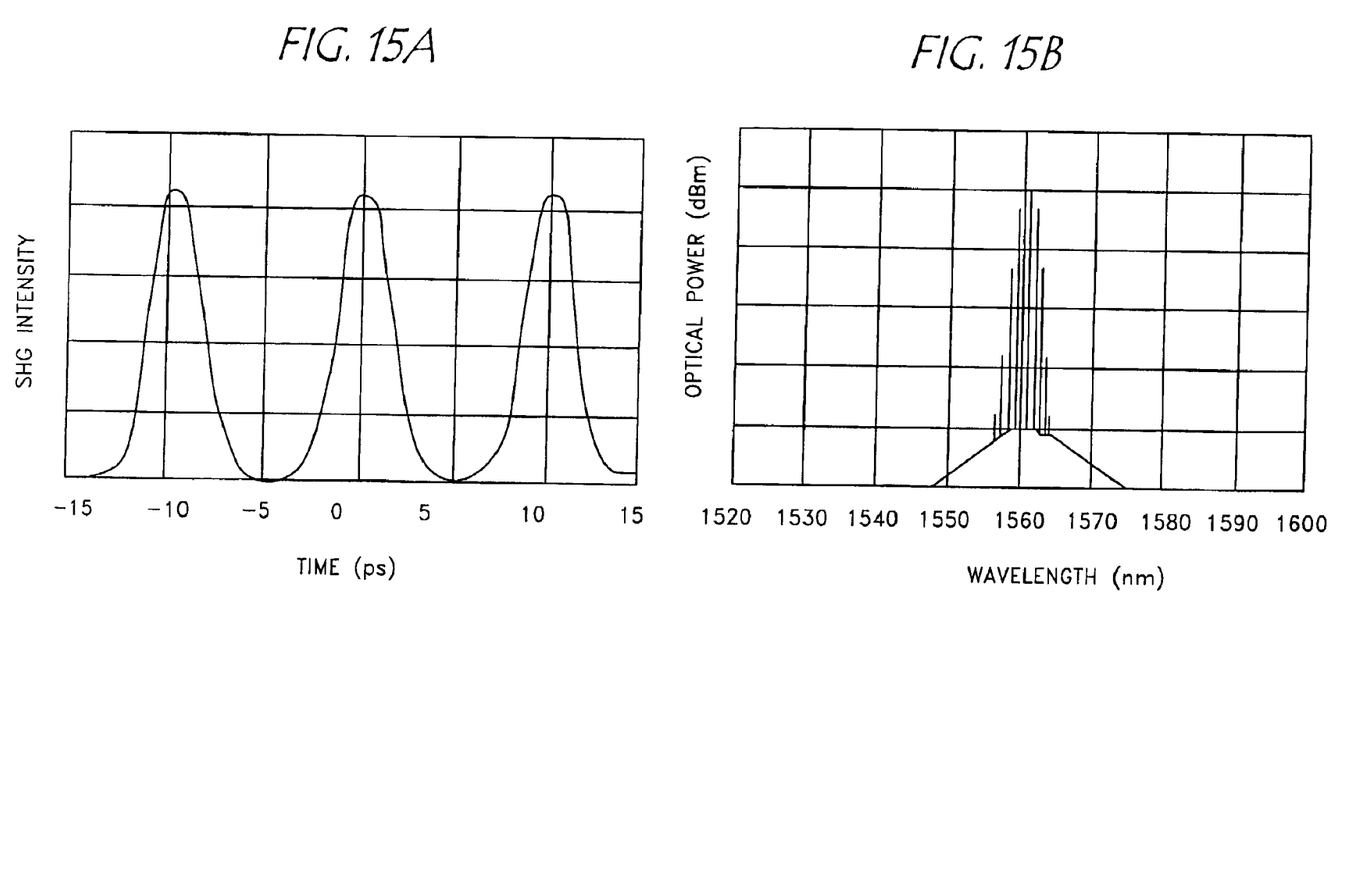
FIG. 15A is a graphical illustration of an autocorrelation function of an amplified signal from the waveform converter of FIG. 14.
FIG. 15B is a graphical illustration of an optical spectrum of the amplified signal of FIG. 15A.

The waveform converter 400 of FIG. 14 can be implemented using, for example, 1550 nm band DSF's 72A–C, 1300 nm band SMF's 74A–C, and an erbium doped optical fiber amplifier (EDFA) 402A. A beat light signal having a wavelength of approximately 1550 nm can be supplied to the input signal section 18 where it is amplified by the EDFA 402A. FIG. 15A illustrates an autocorrelation trace 500 of the amplified signal, and FIG. 15B illustrates an optical spectrum of the amplified signal that is supplied to the nonlinear medium input section 404. As illustrated in FIGS. 15A–B, the optical pulses of the amplified signal have a pulse period of approximately 100 GHz, a pulse autocorrelation at full-width, half-maximum (FWHM) of approximately 3 ps, and a center wavelength of approximately 1560 nm.

Figure 16A:
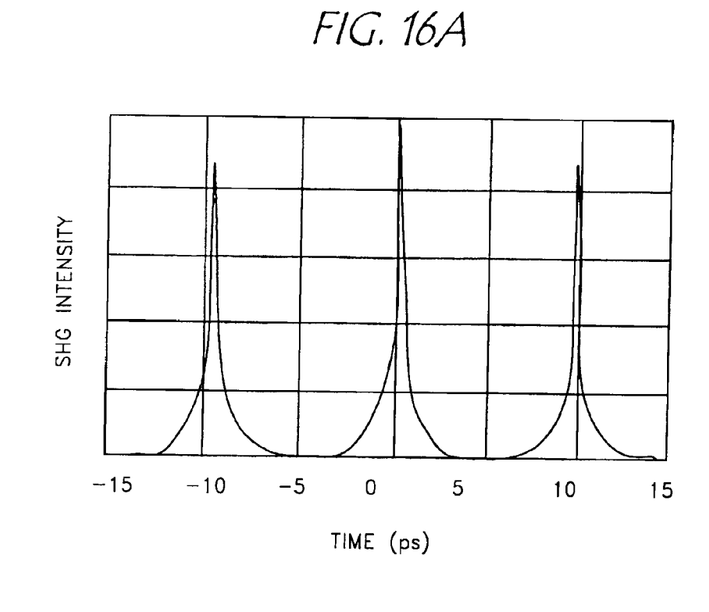
FIG. 16A is a graphical illustration of an autocorrelation function of an optical signal produced at the dispersion medium output section of the waveform converter of FIG. 14.
Figure 16B:
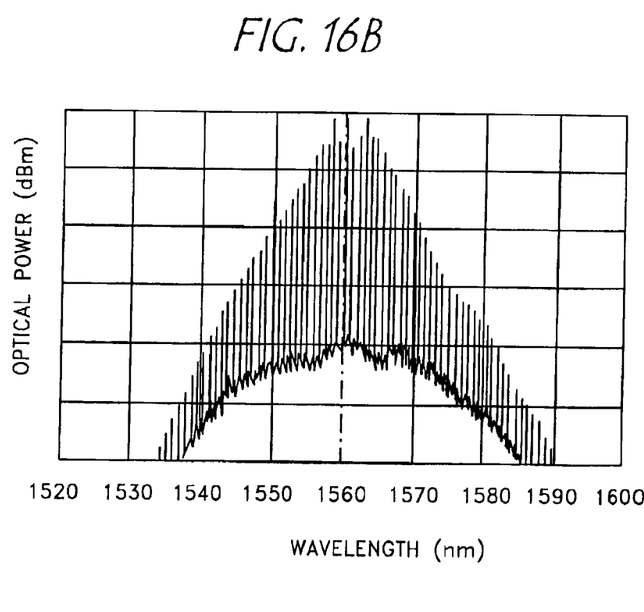
FIG. 16B is a graphical illustration of an optical spectrum of the optical signal of FIG. 16A.

The amplified optical signal is then transmitted through the nonlinear medium and dispersion medium optical transmission path, and the signal produced at the dispersion medium output section 406 is illustrated in the autocorrelation graph of FIG. 16A and the optical spectrum graph of FIG. 16B. As illustrated in FIGS. 16A–B, the optical pulses supplied to the transmission path were compressed as shown by the autocorrelation FWHM reduction from 3 ps to 0.46 ps, and the optical spectrum was substantially widened.

Figure 17A:
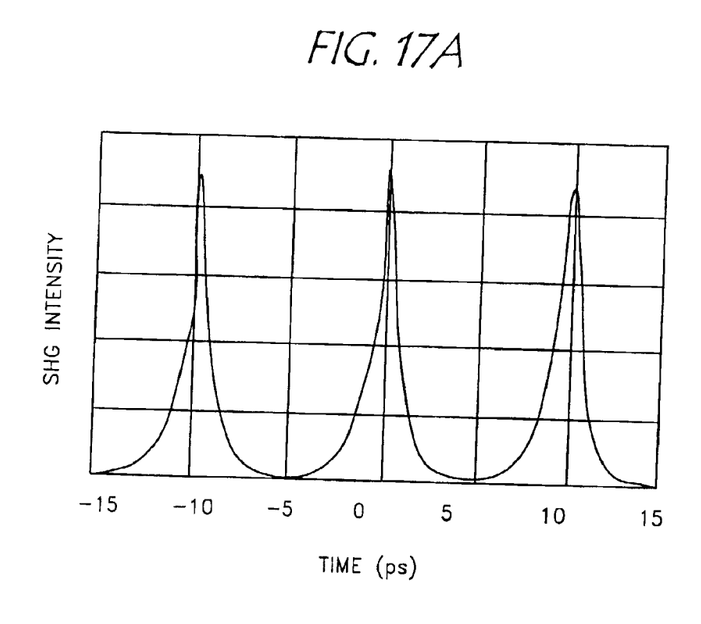
FIG. 17A is a graphical illustration of an autocorrelation function of an optical signal produced at the output signal section of the waveform converter of FIG. 14.
Figure 17B:
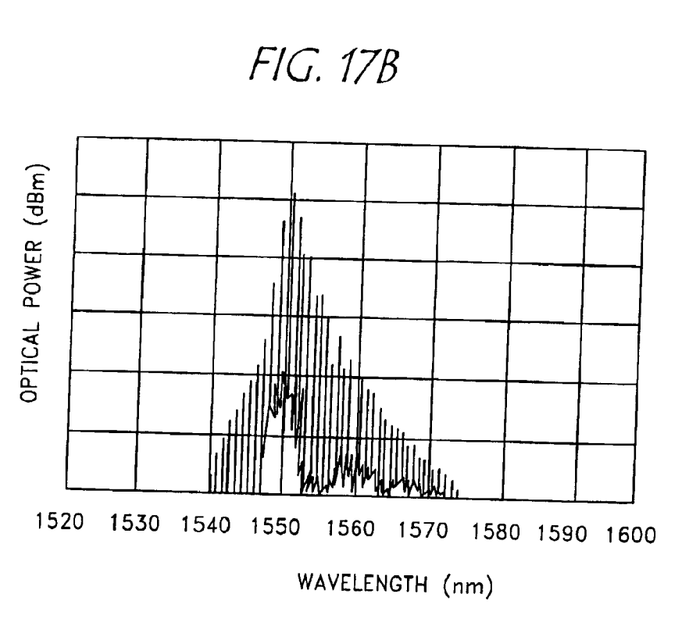
FIG. 17B is a graphical illustration of an optical spectrum of the optical signal of FIG. 17A.

The optical signal is then transmitted through the wavelength selecting element 16, where a center wavelength of 1550 nm can be selected. The signal produced from the wavelength selecting element 16 has an autocorreleation as illustrated in FIG. 17A, and an optical spectrum as illustrated in FIG. 17B. The optical spectrum shown in FIG. 17B illustrates the new center frequency of 1550 nm for the optical signal. In addition to selecting the desired wavelength from a wide ranging optical spectrum, the wavelength selecting element 16 can effectively remove amplified spontaneous emission (ASE) noise which was generated by the optical amplifier 402A. This reduction in noise can be seen by comparing the optical spectrum of FIG. 17B with that of FIGS. 15B and 16B.

Although the pulse width shown in the autocorrelation graph of FIG. 17A is approximately 1.4 ps (FWHM), which is larger than that of the optical signal immediately following compression as illustrated in FIG. 16A, an overall pulse width compression was achieved by the converter 400. The overall pulse width compression can be seen by comparing the pulse width of the autocorrelation of FIG. 17A to that of FIG. 15A.

The waveform converter 400 of FIG. 14 is therefore not only capable of reducing the pulse width of an optical signal, but also optimizing transmitted optical pulses by selecting spectral components in the desired wavelength and removing noise components.

Figure 18:
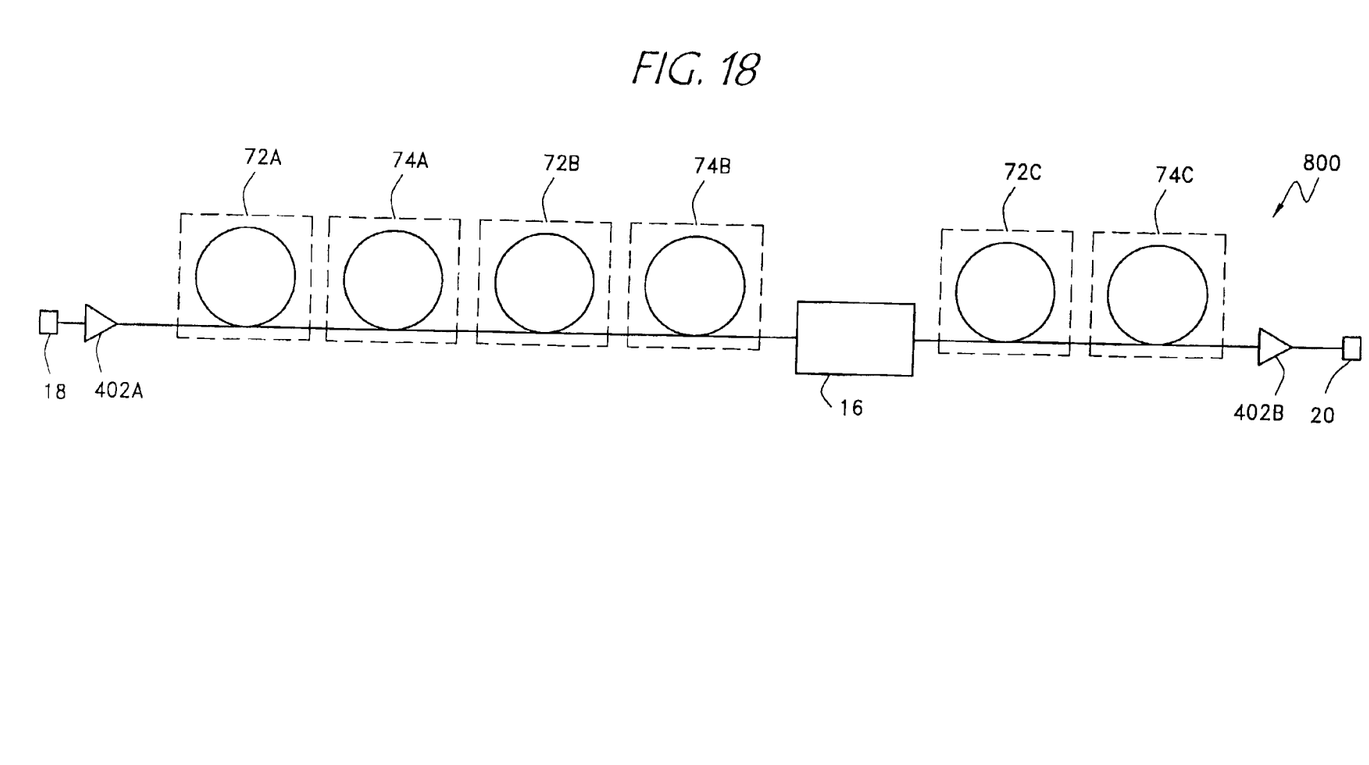
FIG. 18 is a block diagram of an additional embodiment of an optical waveform converter.

FIG. 18 illustrates an additional embodiment of a waveform converter 800. The converter 800 can be formed by placing the wavelength selecting element 16 between the second-stage SMF 74B and the third-stage DSF 72C, and by placing a second optical amplifier 402B immediately before the output signal section 20 of the converter 400 from FIG. 15.

In the converter 800, spectral components in the desired wavelength range are selected from an optical pulse by the wavelength selecting element 16 after the pulse width has been reduced and the optical spectrum widened by the first and second stage DSF and SMF elements 72A–B, 74A–B. Following wavelength range selection, the optical pulse width can be further reduced along with widening of the optical spectrum by the third-stage DSF and SMF elements 72C, 74C. The resulting optical pulse can then be amplified by the second amplifier 402B, and provided to the output signal section 20 as a high-power optical pulse.

Figure 19:
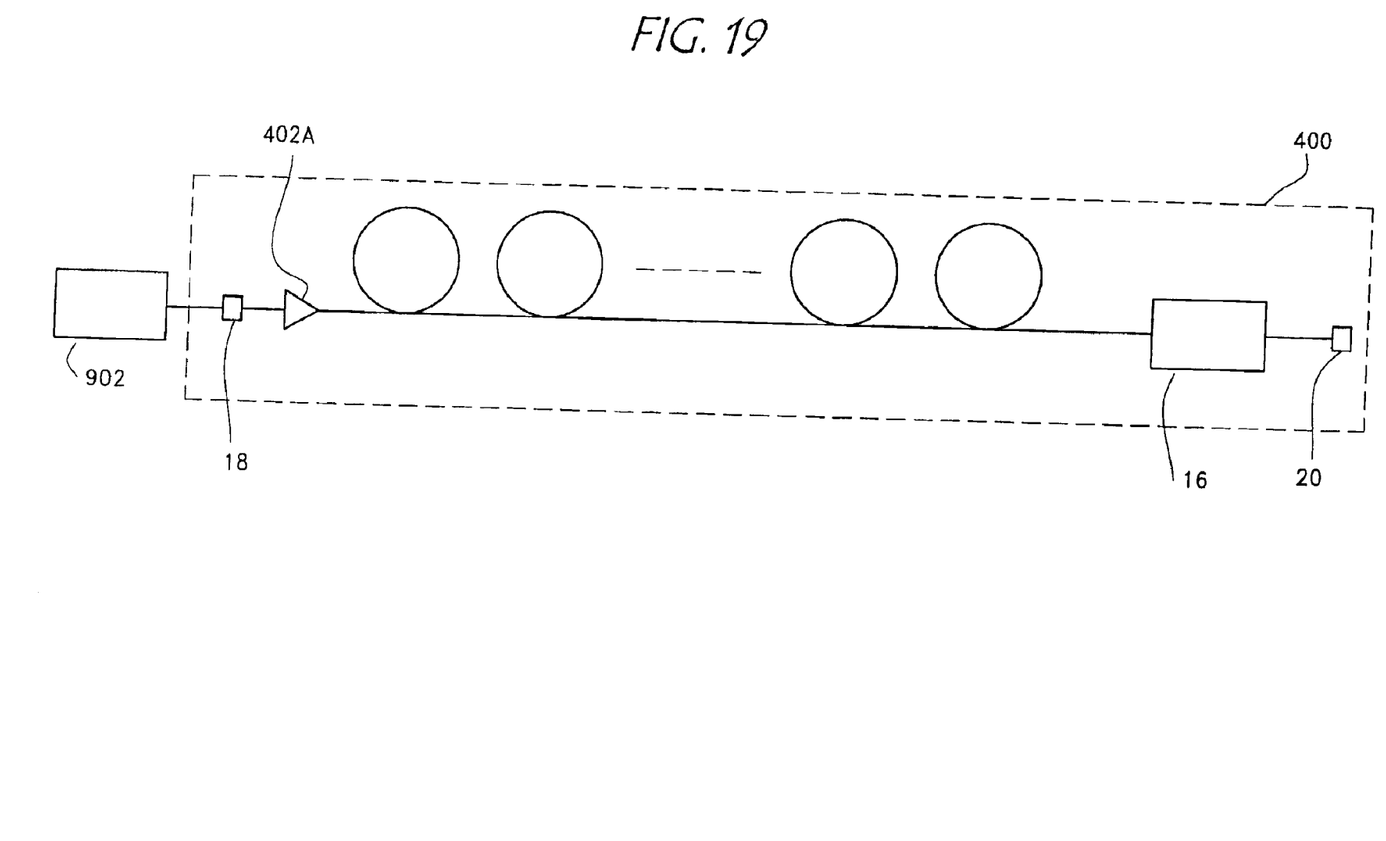
FIG. 19 is a block diagram of one embodiment of an optical pulse light source.

FIG. 19 illustrates one embodiment of an optical pulse light source 900. The optical pulse light source 900 can be formed by connecting a modulated signal light source 902 for generating periodically intensity modulated optical pulses to the input signal section 18 of the converter 400 shown in FIG. 15.

The modulated signal can be generated by, for example, a direct modulation method in which a laser diode is used as a light source and a light source drive current is modulated, an external intensity modulator, or a method in which optical pulses from two light sources having different wavelengths are combined to affect modulation by beating between the wavelengths. Modulated optical pulses obtained from the modulated signal light source 902 can then be converted by waveform shaping elements of the converter 400 into optical pulses having the desired optical spectrum and pulse duration.

In the above described waveform converter embodiments, the dispersion medium and nonlinear medium are not limited to the described optical fibers. The dispersion medium may be implemented using, for example, a photonic crystal. The nonlinear medium may be implemented by, for example, optical waveguides having high nonlinearity, nonlinear optical crystals, or photonic crystal materials such as chalcogenida fibers. These devices or materials may have a dispersion effect as well as a nonlinear effect. Furthermore, the wavelength selecting element may be implemented using such devices as a bandpass filter or a Fabry-Perot interferometer having a periodic structure. Overall, the elements of the described and illustrated waveform converter embodiments are not limited to the exemplary mediums disclosed herein, nor is the disclosed converter limited to the order in which the elements are described or appear in the figures.

Note that in each of the above-described embodiments shown in FIGS. 1, 5, 6, 7, 14, 18 and 19, every one of the optical components may have a polarization-maintaining characteristic. For example, in the embodiment shown in FIG. 5, a polarization-maintaining filter may be inserted in the DSF 52. In the embodiment shown in FIG. 19, the light source 902 and polarization-maintaining optical amplifier 402A may have such a characteristic as to produce a constant polarization output.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An optical pulse waveform converter, comprising:
   an optical pulse input port configured to receive an input optical pulse;
   a nonlinear optical element configured to broaden a wavelength content of an optical pulse routed through said nonlinear optical element;
   a dispersive optical element separate from said nonlinear optical element and configured to modify a temporal profile of an optical pulse routed through said dispersive optical element;
   a wavelength selecting optical element configured to pass selected wavelength components of an optical pulse routed through said wavelength selecting optical element; and
   an optical pulse output port configured to output an optical pulse comprising different optical characteristics than said input optical pulse, wherein
   the non-linear optical element, the dispersive optical element, and the wavelength selecting optical element connect the optical pulse input port to the optical pulse output port, and
   the non-linear optical element, the dispersive optical element, and the wavelength selecting optical element are directly connected to one another according to one of a plurality of predetermined arrangements.

2. The waveform converter of claim 1, wherein said nonlinear element and said dispersion element comprise:
   a plurality of optical fibers having different nonlinear coefficients; and
   a plurality of optical fibers having different dispersion characteristics.

3. The waveform converter of claim 2, wherein said optical fibers having different nonlinear coefficients are alternately disposed with said optical fibers having different dispersion characteristics.

4. The waveform converter of claim 2, wherein said optical fibers differ in length.

5. The waveform converter of claim 1, wherein said nonlinear element comprises:
   a highly nonlinear optical fiber having a nonlinear coefficient of 5.0 $W^{-1}$ $km^{-1}$ or larger.

6. The waveform converter of claim 1, further comprising:
   at least one optical amplifier.

7. The waveform converter of claim 1, wherein said dispersive optical element and said wavelength selecting optical element are combined in a single optical medium.

8. The waveform converter of claim 7, wherein said single optical medium comprises:
   a chirped fiber Bragg grating.

9. The waveform converter of claim 1, wherein said coupled optical elements are coupled in the order of input port, nonlinear optical element, dispersive optical element, wavelength selecting optical element, output port.

10. The waveform converter of claim 1, wherein said coupled optical elements are coupled in the order of input port, dispersive optical element, nonlinear optical element, wavelength selecting optical element, output port.

11. The waveform converter of claim 1, wherein said wavelength selecting element comprises:
    a fiber grating.

12. The waveform converter of claim 1, wherein said wavelength selecting element comprises:
    a bandpass filter.

13. A device configured to modify an optical signal having a pulse waveform, said device comprising:
    means for exerting a nonlinear effect on said pulse waveform;
    means for exerting a dispersion effect on said pulse waveform; and
    means for changing an optical spectrum profile of said pulse waveform, wherein
    said means for exerting a nonlinear effect, means for exerting a dispersion effect, and said means for changing an optical spectrum profile are directly coupled in one of a plurality of predetermined arrangements.

14. An optical pulse light source, comprising:
    a modulated signal light source having output pulses characterized by a temporal waveform and a wavelength content; and
    a waveform converter coupled to receive said output pulses from said signal light source and including
    a nonlinear optical element,
    a dispersive optical element separate from said nonlinear optical element, and
    a wavelength selecting optical element, wherein
    said waveform converter is configured to output optical pulses which have different wavelength content than said optical pulses output from said signal light source, and
    the non-linear optical element, the dispersive optical element, and the wavelength selecting optical element are directly connected to one another according to one of a plurality of predetermined arrangements.

15. The light source of claim 14, wherein said output optical pulses from said waveform converter have a center wavelength closer to 1550 nm than the center wavelength of said modulated signal light source output pulses.

16. A device configured to produce a optical pulses for optical amplification and communication, said device comprising:
    a laser configured to produce a modulated light signal output; and
    a waveform converter having said light signal output as an input, said waveform converter including:
        a nonlinear optical element configured to broaden a wavelength content of an optical pulse routed through said nonlinear optical element;
        a dispersive optical element configured to modify a temporal profile of an optical pulse routed through said dispersive optical element; and
        a wavelength selecting optical element configured to pass selected wavelength components of an optical pulse routed through said wavelength selecting optical element, wherein
the non-linear optical element, the dispersive optical element, and the wavelength selecting optical element are directly connected to one another according to one of a plurality of predetermined arrangements.

17. A method of changing the wavelength content of a first optical pulse, wherein said first optical pulse has an optical spectrum centered at a first wavelength, said method comprising:

sequentially spreading a wavelength profile and a temporal profile of the optical spectrum of said first optical pulse in two separate and directly connected optical devices to produce a spread optical spectrum;

selecting with a third optical device directly connected to said two separate and directly connected optical devices a second wavelength from said spread optical spectrum; and filtering wavelengths outside of a selected wavelength band around said second wavelength band so as to produce a second optical pulse having an optical spectrum centered approximately at said second wavelength.

* * * * *